Figure 11:
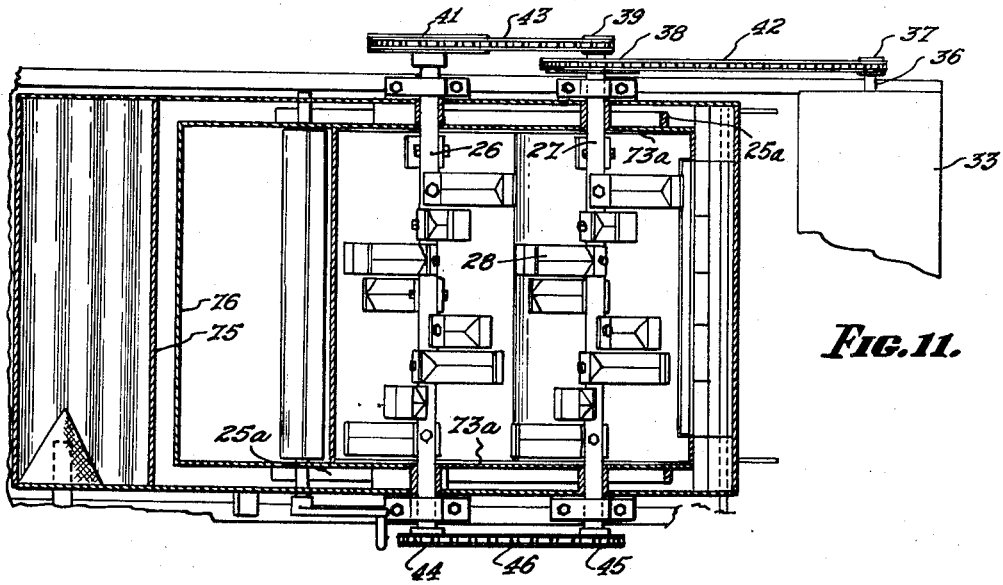

Jan. 6, 1959 W. T. CAMM 2,867,421
BITUMINOUS MIXER, MOBILE, COMPLETE WITH HEATED BITUMEN
TANK, AND COMBINED AGGREGATE DRIER AND MIXER
Filed May 11, 1955 4 Sheets-Sheet 1
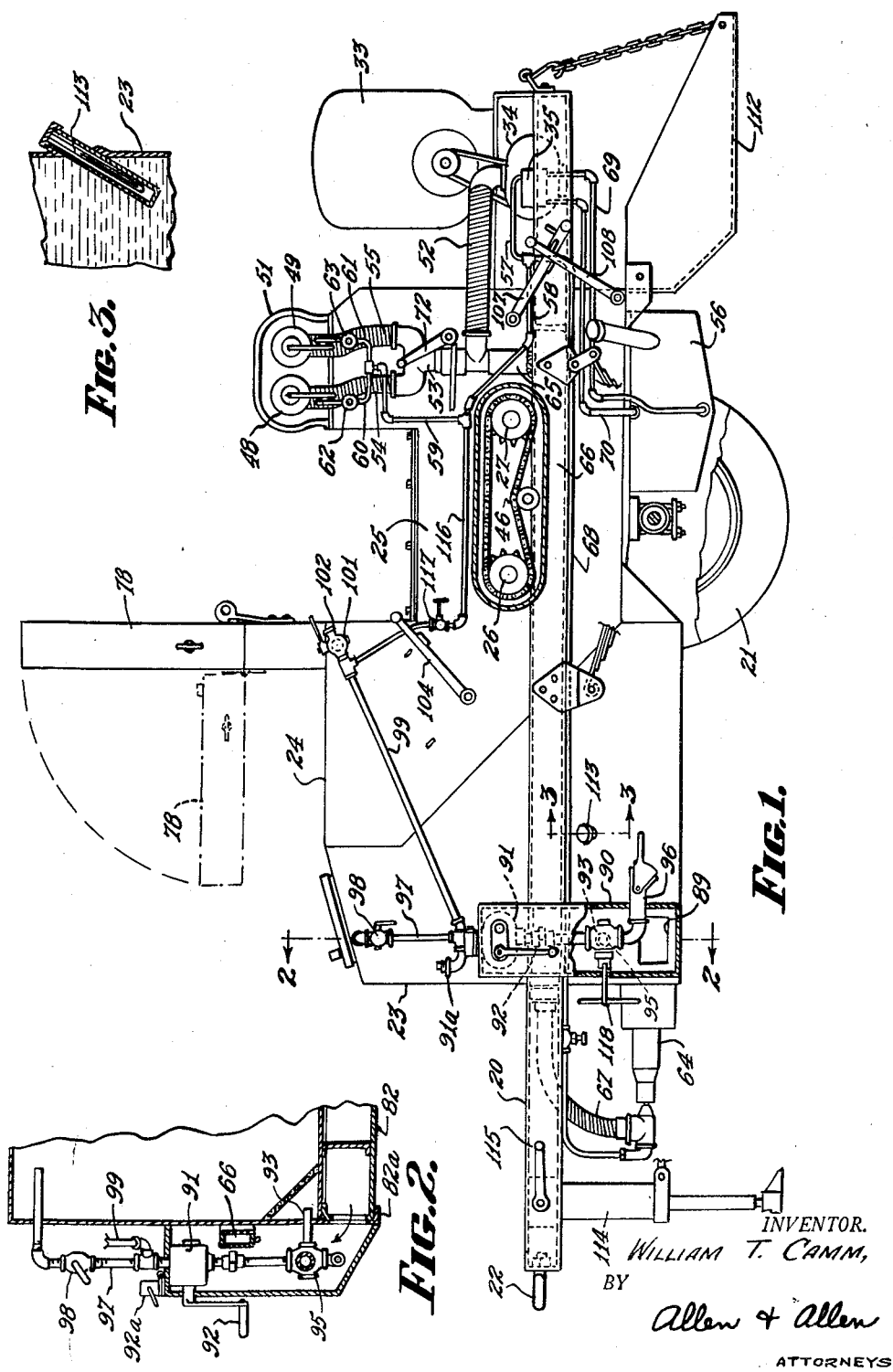
INVENTOR.
WILLIAM T. CAMM,
BY
Allen & Allen
ATTORNEYS.

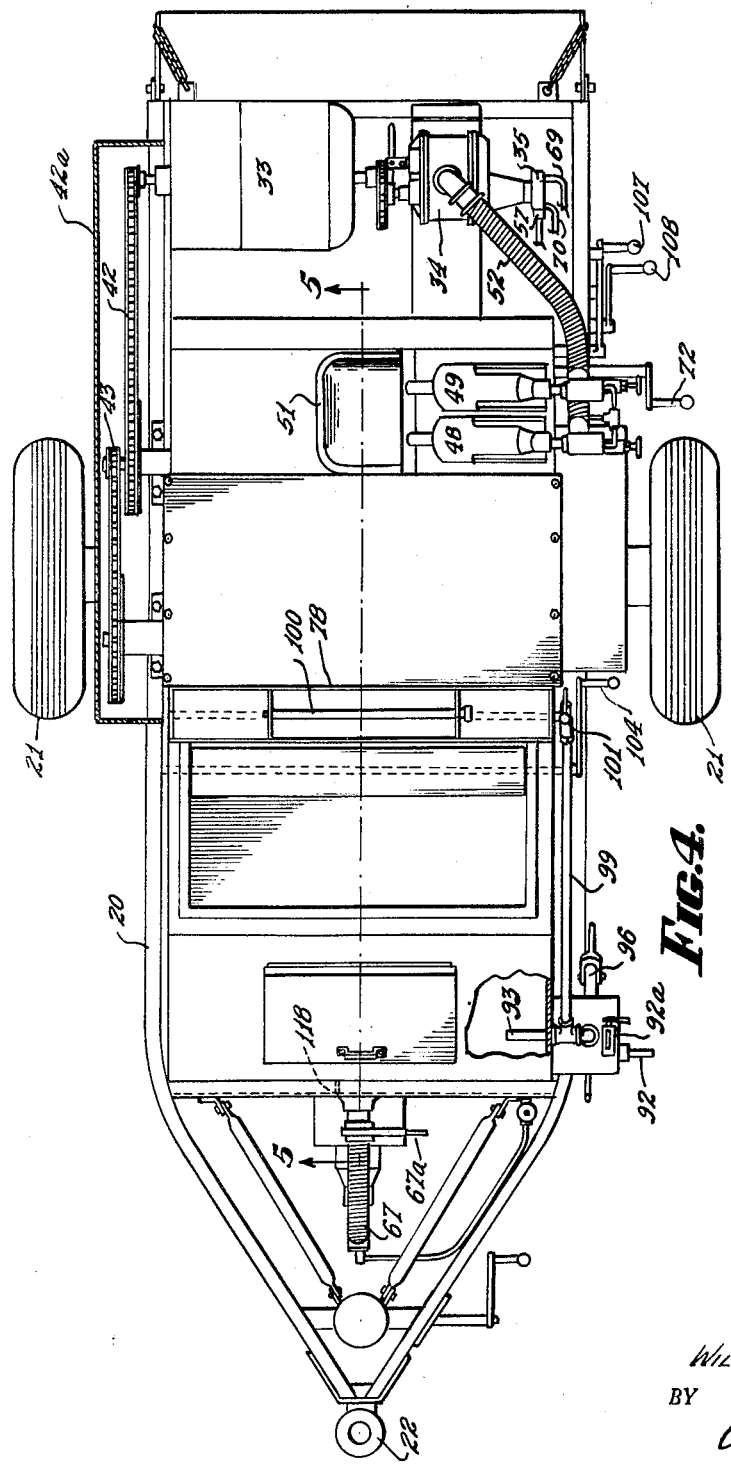

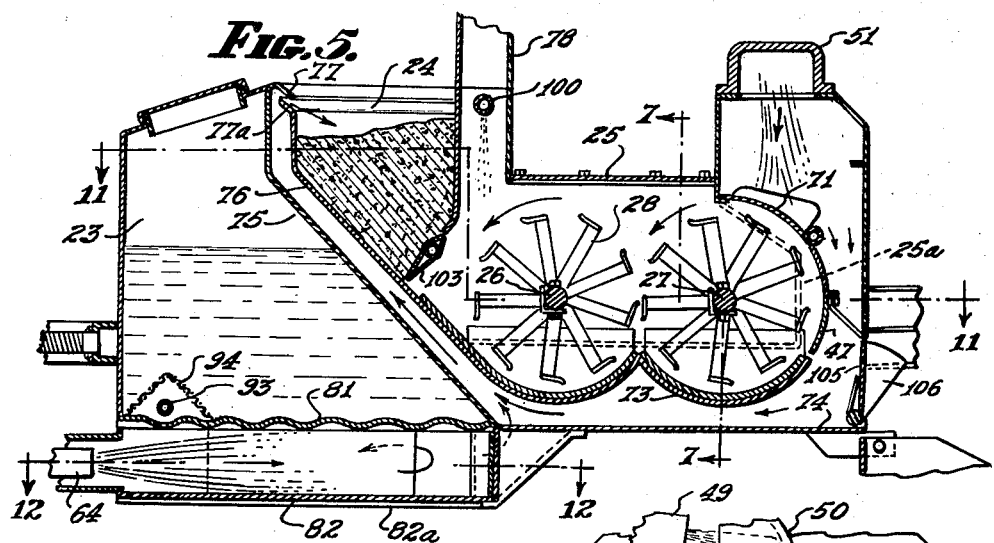
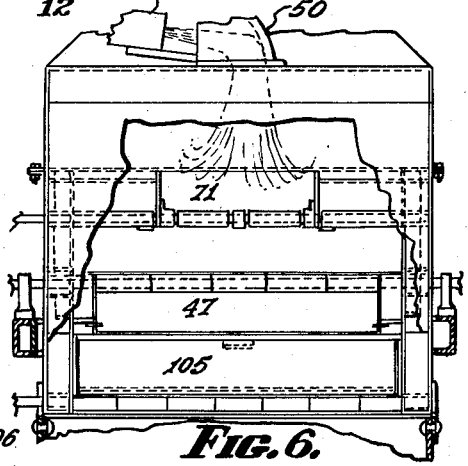
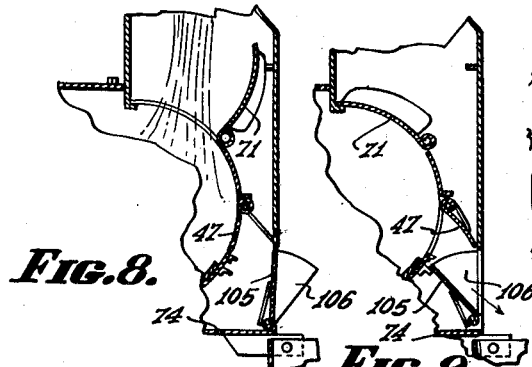
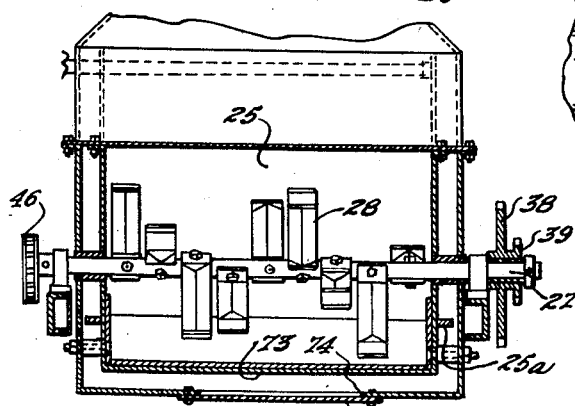
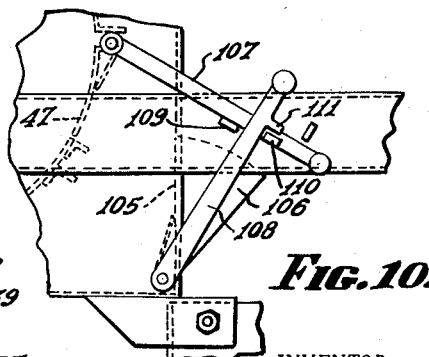

Jan. 6, 1959 W. T. CAMM 2,867,421
BITUMINOUS MIXER, MOBILE, COMPLETE WITH HEATED BITUMEN
TANK, AND COMBINED AGGREGATE DRIER AND MIXER
Filed May 11, 1955 4 Sheets-Sheet 4

INVENTOR.
WILLIAM T. CAMM,
BY
Allen & Allen
ATTORNEYS.

United States Patent Office 2,867,421
Patented Jan. 6, 1959

2,867,421

BITUMINOUS MIXER, MOBILE, COMPLETE WITH HEATED BITUMEN TANK, AND COMBINED AGGREGATE DRIER AND MIXER

William T. Camm, Fort Thomas, Ky., assignor to Littleford Brothers, Inc., Cincinnati, Ohio, a corporation of Ohio Application May 11, 1955, Serial No. 507,585

21 Claims. (Cl. 259—158)

My invention resides in the provision of an efficient road patching machine which may be towed from place to place as required and which will mix varying amounts of hot bitumen and aggregate material as required.

Proper maintenance of our road systems is an extremely important task. Roads are subjected to all kinds of wear and tear with the result that various repairs are continuously necessary. Such repairs may extend from simple small cracks to large holes and sections of rough and uneven surface. Such repairs may be needed in road areas closely adjacent one another or it may be that they are scattered at random throughout a large area.

Because of the varying nature of the kind of repair needed as above described and because of the haphazard occurrence of road defects, it has been a problem in the past to get the necessary repair materials to the place required with a minimum of waste.

A very important object of my invention, therefore, is to provide a portable road patching machine in which the desired amounts of aggregate materials and bitumen may be blended together at the very place where repairs are needed.

Another very important object of my invention is to provide means to obtain hot dry aggregate and hot bituminous binder in the proper proportions.

It is also an object of my invention to provide a machine of the type described in which the bitumen tank, aggregate bin and mixing chamber are located so as to provide an efficient arrangement and so as to make the greatest possible use of the fuel needed for supplying heat during the various stages of the drying and mixing operations.

An important object of my invention is to provide means whereby an operator will have hot patching material as desired at the point of use.

A further object of my invention is to provide a portable road patching machine in which an extremely good mixing action is assured.

Yet another object of my invention is to provide a machine of the type described which is extremely safe and easy to use.

It is also an object of my invention to incorporate in the drying and mixing machine a bitumen metering system which will make the machine versatile.

Another important object of my invention is to provide means whereby flame can be directed into a twin shaft pug mill mixer for the purpose of drying the aggregate, or outside the pug mill mixer after the bitumen is added, at the will of the operator.

Figure 12:
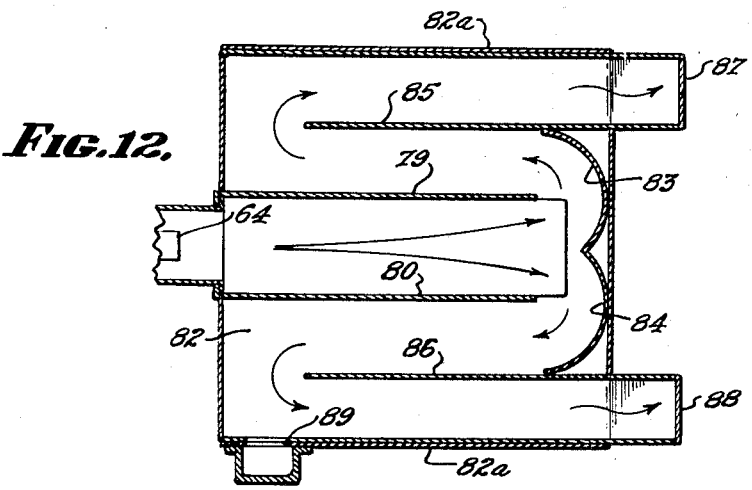
Figures 13, 14, 15:
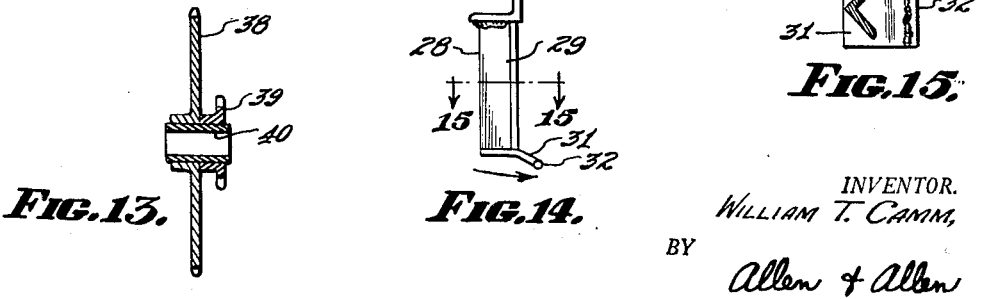

These and other objects of my invention will become apparent to those skilled in this art from a study of the following description and with reference to the accompanying drawings in which drawings like numerals are employed to designate like parts and in which:

Figure 1 is a side elevation, with a few parts broken away, of the machine of my invention, Figure 2 is a section taken on the line 2—2 of Figure 1, Figure 3 is a section taken on the line 3—3 of Figure 1, Figure 4 is a plan view of the machine of this invention, Figure 5 is a section taken on the line 5—5 of Figure 4, Figure 6 is an end view, partly in section, taken from the right side of Figure 5, Figure 7 is a section taken on the line 7—7 of Figure 5, Figure 8 is an enlarged sectional view of that portion of the machine wherein flames and heat are brought to the mixing chamber, Figure 9 is a view similar to that of Figure 8 but showing an alternate position of various of the parts, Figure 10 is an enlarged fragmentary sectional view of that portion of the machine where the levers for actuating certain of the chamber doors are located, Figure 11 is a section taken on the line 11—11 of Figure 5, Figure 12 is a section taken on the line 12—12 of Figure 5, Figure 13 is an enlarged sectional view of a pair of sprockets used in the drive arrangement for the mixing chamber, Figure 14 is a side elevation of one of the mixing arms normally carried on a shaft extending through the mixing chamber, and Figure 15 is a section taken on the line 15—15 of Figure 14.

Referring now to the drawings, particularly Figure 1, it will be observed that my portable road patching machine comprises a wheel supported frame on which is mounted various apparatus, the frame and apparatus adapted to be pulled by a truck, tractor or the like. To this end I have provided a frame generally indicated at 20 which is mounted by conventional means on a pair of wheels 21. A hitch 22 is also provided. The wheels, of course, are not critical to the operation of the patching machine and in some instances may be omitted.

Mounted on the frame 20 are an asphalt tank 23, an aggregate bin 24 and a mixing chamber 25, the chamber here shown comprising a pug mill. Within the pug mill 25 are a pair of shafts 26 and 27 to each of which there is affixed a number of arms or blades 28. As best seen in Figures 14 and 15 these blades may comprise simply an elongated angle bar 29 welded or otherwise affixed to an angle member 30 at one end and having a bent plate 31 affixed thereto at the other end. The free or leading edge of the member 31 is made abrasion resistant by depositing hard surface weld metal 32 along the wearing surface.

Although the preferred embodiment of my invention utilizes the asphalt tank 23 as just noted, it is to be understood that such is not essential to all the novel features comprising the apparatus of this invention. It is conceivable that the bitumen could be handled in a separate vehicle or container.

Also mounted on the frame 20 is a gasoline engine 33 which drives a chain and sprocket transmission, to be described, for driving the shafts 26 and 27 and for actuating a blower 34 and fuel pump 35. The work shafts 26 and 27 of the pug mill 25 are driven by the engine 33 as follows. As best seen in Figure 11 the drive shaft 36 of the engine 33 has a small sprocket 37 fixed thereto. A large sprocket 38 and a small sprocket 39, see also Figure 13, are fixed to a sleeve 40. This sleeve is adapted to rotate freely on the shaft 27. A large sprocket 41 is fixed to the shaft 26. A pair of chains extend between the sprockets 37 and 38 and the sprockets 39 and 41 respectively in order to transmit the drive power from the motor 33 as desired. Fixed on the other ends of shafts 26 and 27 respectively are sprockets 44 and 45. A chain 46, similar to chains 42 and 43, connects these sprockets operatively to one another. From this arrangement it will be observed that the shaft 27 is driven by the motor 33 through a transmission arrangement which includes the chain 42, sprockets 38 and 39, chain 43, sprocket 41, shaft 26, sprockets 44 and 45, and the chain 46. By this arrangement I not only get the various driving ratios as desired but I also am able to drive the shafts 26 and 27 in the same direction. Suitable chain guards, as shown at 42a in Figure 4, are also provided.

Referring also to Figure 5 it will be observed that the pug mill generally indicated at 25 is surrounded by an air jacket. The shafts 26 and 27 within the pug mill 25 will rotate in the same direction as indicated by the arrows in Figure 5. I find that this results in a greatly improved drying and mixing action within the pug mill and it also insures that the materials within the mill are continuously urged toward the exit gate which I have indicated at 47. This gate is shown in its closed position in Figure 5.

Means for supplying flame and heat to the pug mill are also provided. As perhaps best seen in Figures 1 and 6 these latter means may comprise a pair of burners 48 and 49 which direct their flame toward the rear wall 50 of the housing 51. These burners are supplied with air by the blower 34 through the conduits 52, 53, 54 and 55. A fuel tank 56 is also supported from the frame 20. The burners 48 and 49 are supplied with fuel by the fuel pump 35 and the conduits 57, 58, 59, 60 and 61. The exact amounts of fuel may be governed by the valves 62 and 63. In this connection it will be understood that no novelty is claimed for the burners 48 and 49 per se and their general operation.

A burner 64 similar to those shown at 48 and 49 is provided for use primarily in connection with the heating of the asphalt within the tank 23. This burner is also supplied with air moved by the blower 34 and to this end I make use of the frame 20 in novel manner. A conduit 65 extends from the conduit 52 to one side of the frame proper. This frame side I have particularly designated at 66. This member 66 is made hollow and air tight so that it will serve as a conduit for air moved by the blower 34. A suitable conduit 67 having an air valve 67a connects the frame member 66 with the burner 64. By making use of the frame itself in this manner I am able to eliminate the necessity of providing further conduits of the type shown and indicated at 52 and 67.

The burner 64 is also supplied with fuel from the tank 56 as moved by the pump 35. In order to accomplish this I provide an additional pipe 68 extending from the conduit 57. The pump 35 draws fuel from the tank 56 through the pipe 69 with a return for the excess being indicated at 70.

The burners 48 and 49 supply necessary heat and flame to the pug mill 25. I have found that it is sometimes desirable to bring this heat into direct contact with the contents of the pug mill while at other times it in desirable only to have the pug mill heated from the outside. Too often in the past serious accidents have occurred when flames have directly contacted the mixture of aggregate and asphalt in the pug mill. In this arrangement the flame need come into direct contact only with the aggregate. Before the asphalt is introduced into the mill the flame may bypass the interior thereof. In order to accomplish this novel feature I provide a gate 71 in the pug mill, which gate is in the path of the flames and heat as directed by the housing 51. This gate 71, which is best seen in Figures 5, 8 and 9, is mounted for swinging movement, which movement is controlled by a lever or handle 72, see Figure 1. When the gates 71 and 47 are in the position shown in Figure 5 the heat and flame from the burners 48 and 49 are not permitted to enter the pug mill 25 and thus come into direct contact with the contents thereof. Rather, such heat and flame are directed through the jacket which is comprised of the floor 73 of the pug mill, the wall 74 of the machine generally, and the side walls 73a of the pug mill, see also Figure 11. The bottom wall 74 is provided with an access plate 74a (see Figure 7). The flame and heat thus circulate about the outside of the pug mill and serve to heat it as required. A baffle 25a is also provided, see Figures 5, 7 and 11, to insure that the major portion of heat and flame pass through this jacket before going out the stack 78 or exit 77 as will now be described.

My machine is so arranged that the walls 75 and 76 of the bitumen tank and aggregate bin respectively cooperate with the pug mill floor 73 and wall 74 to continue the air jacket to a place of exit generally indicated at 77. In this manner the heat from the burners 48 and 49 not only serves to heat the contents of the pug mill 25 but it also serves to heat the contents of the bitumen tank and aggregate bin. This relationship among the tank, bin, pug mill and heating system is believed novel with me. Note also that the members 77 and 77a direct the escaping gases into direct contact with the contents of the bin 24, see Figure 5. At the same time this arrangement insures that such hot gases do not contact the bitumen directly, thus greatly reducing the chances of fire and its attendant dangers.

When the door 71 is moved by actuation of the handle 72 by the operator to the position of Figure 8 a different result is obtained. Such movement of the door 71 permits the flame and heat to come into direct contact with the contents of the pug mill as is sometimes desired. An exhaust stack 78 is provided in order to get rid of the various gases which may appear particularly during those periods when the flame enters the pug mill as shown in Figure 8. This stack may be moved to the dotted line position of Figure 1 when not in use.

The burner 64 serves primarily to heat the bitumen within the tank 23. Here also, however, I have provided a novel arrangement which not only insures the best use of the heat for the tank but which also uses such heat to supplement that provided for the aggregate bin. As perhaps best seen in Figures 5 and 12 the burner 64 discharges into a drawer type housing made up of a plurality of walls to direct the heat and flame in a serpentine path. The flame and heat initially enter a passageway defined by a pair of walls 79 and 80 between the floor 81 of the tank 23 and the bottom 82 of the housing. Note that in order to insure maximum heat transfer to the tank 23 I make the floor 81 corrugated as indicated. Also, this drawer type housing rests on shelves or ledges 82a and is easily removed. This arrangement is desirable in that not only is it easier to clean but also it is easier to build. And should it become necessary to get at the floor 81 it is a simple matter to remove this heat drawer.

The flame and heat as guided by the walls 79 and 80 strike a pair of baffles 83 and 84 which direct the flame and heat equally between walls 79 and 85 and walls 80 and 86 respectively. Such flame and heat may then pass around the ends of the walls 85 and 86 to areas 87 and 88 which connect with that portion of the jacket formed by the walls 75 and 76. Thus not only does the burner 64 serve to provide primary heat to the contents of the tank 23 through the corrugated floor 82 but it also provides heat for the bin 24. In addition this burner, by means of the passageway formed by the walls 75 and 76, serves to heat further the bitumen within the upper regions of tank 23. As will be explained in greater detail shortly this burner also provides heat for the bitumen metering system. Such heat leaves the chamber through the orifice 89 shown in Figures 12 and 1.

The pumping system just referred to comprises a housing 90 within which the pump 91 is located. This pump is designed to be operated manually by manipulation of the handle 92. A counter 92a affords control over the quantity of bitumen pumped. Liquid bitumen from the tank 23 enters the pumping system through a conduit 93 which is best seen in Figures 1, 2 and 5. A screen 94 protects the conduit 93 from being clogged by larger undissolved particles of material. In addition the pump is provided with a normally plugged line 91a which may be used for priming purposes if necessary, see Figure 1.

A series of valves and conduits control distribution and utilization of the liquid bitumen from the tank 23. There is a valve 95 which may be manipulated so as to permit bitumen to be drawn from the tank through the conduit 96 and simply collected in a bucket or the like as desired.

It is sometimes desirable to circulate the bitumen within the tank 23. This I accomplish by providing a conduit 97 and valve 98. When the valve 98 is open the action of the pump 91 is to bring bitumen through the conduit 93 into the pumping apparatus and to discharge it back into the upper regions of the tank 23 as will be apparent from an examination of Figure 1. At other times it is desirable to discharge given quantities of hot liquid bitumen into the pug mill so that it may be mixed thoroughly with the aggregate from the bin 24. To this end I provide conduits 99 and 100 and a valve 101. When this latter valve is properly set bitumen will be pumped through the conduit 99 into the conduit 100 which is perforated so that the bitumen will be evenly distributed within the pug mill. This is perhaps best seen in Figure 5 where it will be observed that the conduit 100 is located within the stack 78. This provides additional heat about this conduit so as to better prevent its being clogged by hardened bitumen.

In addition to supplying a tap for the taking off of bitumen when desired, to recirculating bitumen at given times, and to discharging bitumen within the pug mill I also provide an arrangement wherein the bitumen may be sprayed directly onto the road through a suitable hose and the like. To this end a suitable cock 102 is provided in connection with the valve 101. A hose may be fastened here and a metered quantity of bitumen pumped therethrough simply by properly adjusting the valve 101 and cranking the handle 92 manually.

In general I contemplate that the bin 24 is of such a size that when it is filled with aggregate and when the door 103 to the pug mill is opened by manipulation of the handle 104, such pug mill will be provided with a full charge of aggregate material. The aggregate material may be dried while the flame is directed into the pug mill 25. When such material is dry the flame is directed outside of the pug mill and then the bitumen is added to the aggregate. After the pug mill has been charged with a quantity of aggregate material from the bin 24 and after a suitable amount of bitumen has been discharged within the pug mill through the member 100, such bitumen and aggregate being then thoroughly mixed within the heated pug mill by operation of the blades attached to the shafts 26 and 27 and driven from the engine 33, it will eventually be required to make such mixture available to the operator for application to the road in need of repair. The wall of the machine is provided with a gate 105 having sides 106 so arranged that it will in discharge position constitute a trough through which the mixed material may flow upon discharge from the pug mill as will be aided by the shafts 26 and 27 turning together in the same direction as indicated in Figure 5. This will, of course, necessitate the gate 47 being opened. It is obviously desirable that the gate 47 not be opened until after the gate 105 be moved to the position shown in Figure 9. Were it otherwise, there would be considerable chance that material within the pug mill would simply fall onto the floor or wall 74 of the machine and there harden making it difficult and messy to remove.

In order to insure that the gate 47 will not be moved to the open position of Figure 9 until the gate 105 has been moved to its discharge position as also shown in Figure 9, the door 71 being closed to prevent the flame coming into direct contact with the mixture of bitumen and aggregate, I provide the following mechanism. A handle 107 is fixed to the gate or door 47. A similar handle 108 is fixed to the gate 105. As best seen in Figure 10 there is a short lug 109 on which the handle 107 normally rests when the door 47 is in closed position. The handle 107 itself has a fairly large lug 110 extending therefrom. The handle 108 has a lug 111 adapted to be immediately adjacent the lug 110 when the gates are in the position shown in Figures 8 and 10. It will be understood that it takes a counter-clockwise movement of the handle 107, as viewed in Figure 10, to move the door 47 to its open or discharge position. Similarly it takes a counter-clockwise movement of the handle 108 in order to move the door 105 to its trough or chute forming position as would be indicated in Figure 9.

From an examination of the apparatus of Figure 10 as just described, it will be apparent that the handle 107 may not be rotated in a counter-clockwise movement until the handle 108 has first been got out of the way by counterclockwise movement. Should an operator mistakenly try to move the handle 107 first he would find himself prevented from so doing by abutment of the lug 110 on the handle 107 against the lug 111 on the handle 108. On the other hand when he moves the handle 108 first he will find that there is nothing obstructing such movement. It will be obvious that the lug 109 must not extend much beyond the outer surface of the handle 107 so that it will not interfere with movement of the handle 108. Since the door 71 is usually closed during such time as material is to be removed via the door 105 it is desirable that flame, if the burners are still in action, be prevented from escaping through such door 105 at the same time. Note that this is accomplished by the door 47 which blocks flame when in the position of Figure 9.

Should it ever become necessary to make the area defined by the walls 73 and 74, see Figure 5, readily available to one from the outside the handles 107 and 108 can be manipulated as follows. First the handle 108 is moved in a counter-clockwise direction so as to bring the gate 105 to the position of Figure 9 or perhaps to a position somewhat short of this complete discharge position. The handle 107 is then moved a short distance through a counter-clockwise path. Finally the two levers are manipulated until the lever or handle 108 clears the lug 110 on the lever or handle 107. Then the handle 108 may be rotated in a clockwise direction to a wide open position. It is contemplated that this be done only in those relatively few times when it might be necessary to get at this area in order to clean same. Normally the relationship between the handles 107 and 108 will be such as is shown in Figure 10 for the reasons above described.

In the preferred embodiment of my machine I employ a pivoted platform, which may be chain supported as shown in Figures 1 and 4, to receive the material as discharged from the pug mill upon opening of the gates 47 and 105. The operator may then shovel the material from this shelf 112 or it may be let down to the road itself and dumped directly from the pug mill as perhaps aided by an operator.

In addition, see Figures 1 and 3, I provide a thermometer 113 which fits within a receptacle extending to a position near the bottom of the asphalt tank 23. This thermometer may easily be reached by an operator from outside of the machine and it enables him to check on the temperature of the contents of the tank.

Also, as will be understood by those skilled in the art, an adjustable stand 114 with a handle 115 is provided.

Yet another novel feature has been incorporated in my improved road patching machine. This lies in the use of the fuel pump and related system to send fuel oil through various of the lines when it is desirable to clean the operating conduits. In order to accomplish this I provide a fuel conduit 116 with a valve 117 therein, this latter conduit extending from the juncture of pipes 58 and 59. This is perhaps best seen in Figure 1. Another conduit 118 is provided between the burner 64 and the valve 95. Thus not only have I so located the various tanks, bins, pumps and so forth as to make best possible use of all available heat in order to insure efficient and free action of the device but also I have provided means whereby such device and the operating elements thereof may be cleaned by fuel oil and the like if necessary.

Should it be desired, for example, to flush out the valve 95 and related conduits, it is necessary only to operate the fuel pump 35 during such time as the burners 48, 49 and 64 are inactive. Thus fuel pumped through the line 57, line 68 and burner 64 will travel through the line 118 to the valve 95 and related structure. By proper setting of the valve 117 in the line 116 fuel may be forced to the valves 101 and 98 and 96 insure that the fuel also reaches the pump 91 and conduit 97. By further adjustment the discharge conduit 100 located in the stack 78 my also be cleansed by having fuel forced therethrough. During such times as the fuel is being used to clean various of the apparatus it is probable that the valves 62 and 63 for the burners 48 and 49 respectively will be closed.

Operation

The operation of my machine is as follows. The bin 24 is filled with a suitable quantity of aggregate material. It is assumed that there is sufficient bitumen within the tank 23. The burner 64 will be ignited so as to bring the bitumen within the tank 23 to the proper and desired temperature. When it is desired to make a batch of hot mix for application to the road defect the door 103 is opened and aggregate material admitted to the pug mill. The shafts 26 and 27 will be rotated by actuation of the engine 33 and connecting transmission. Flame and heat may be applied either around the pug mill or directly within it as desired by proper positioning of the door 71. Normally the door 71 will be open when there is only aggregate material in the pug mill and closed when bitumen is there introduced. The heat from the burners 48 and 49 will not only heat the outside of the pug mill, when the door 71 is closed, but it will also supplement the heating of the bitumen within the tank 23 as well as have a warming action at least on the aggregate material within the bin 24.

Similarly the heat from the burner 64 is conducted through a path beneath the tank 23 designed to give most efficient heating thereof and then used to supplement the heating of the tank contents in the upper regions thereof as well as the aggregate bin. Moreover the pumping system is associated with the heat transfer means so that it gets the benefit thereof thus greatly reducing the amount of clogging which might otherwise occur.

Bitumen may be taken off directly from the conduit and tap 96 or it may be recirculated if that is desired. In addition, bitumen may be discharged directly within the pug mill through the member 100 as governed by the valve 101 or it may be drawn off through a hose or the like attached to the cock 102.

Upon proper heating and mixing of the materials, both aggregate and bitumen, within the pug mill by the shafts 26 and 27, which turn in the same direction as indicated, material may be made available to the operator by first opening the gate 105 and then the gate 47. Since the shafts 26 and 27 turn together in the same direction as indicated they serve to force the material from the pug mill. That the material will fall upon the chute formed by the gate 105 is guaranteed by the relationship between the handle 107 and 108 wherein it is not possible to open the gate 47 until the gate 105 has been moved to proper discharge position. The hot mix from the pug mill thus comes down the chute formed by the member 105 to the pivoted shelf 112 from which it may be shoveled by an operator or from which it may fall by gravity should the chains be lowered.

In order to operate the burner 64 from the same blower 34 which is used in connection with the burners 48 and 49 it is again pointed out that I make use of one of the frame members (66) of the basic machine frame. Such member was simply made hollow and air tight and provided with an obstruction 118 located adjacent the conduit 67, see Figure 4.

Also, as above explained, should it become necessary to clean any of the valves or conduits through which the bitumen normally flows, it is possible to do so by pumping fuel therethrough from the pump 35. In order to do this, suitable conduits have been provided and it will be readily apparent to those skilled in the art that proper adjustment of the various valves will insure that the fuel is brought to the desired places.

It will be obvious to those skilled in this art that modifications may be made in the structure shown without departing from the scope and spirit of this invention. It is also to be understood that while I have shown this invention as embodied in particular structure by way of example, I do not intend to be limited to such structure except insofar as it is specifically set forth in the subjoined claims.

Having thus described my invention, what I claim as new and what I desire to protect by United States Letters Patent is:

1. A road patching machine comprising a frame, a twin shaft pug mill mounted on said frame, a jacket surrounding said pug mill, a first burner adjacent said pug mill, and means selective to direct heat and flames from said first burner into said pug mill or into said jacket.

2. The machine of claim 1 including an aggregate bin mounted on said frame and heat conduit means extending from said pug mill jacket and first burner to said bin.

3. The machine of claim 1 including a bitumen tank mounted on said frame, a second burner adjacent said tank for heating the contents of said tank, and heat conduit means extending from said pug mill jacket and said first burner into heat transfer contact with said tank.

4. The machine of claim 3 including a drawer type housing into which said second burner directs its flame and heat, said housing being removably mounted beneath said tank.

5. The machine of claim 4 including a series of baffles in said drawer type housing defining a pair of serpentine paths.

6. The machine of claim 1 including an aggregate bin and an asphalt tank mounted on said frame, a second burner adjacent said tank, heat conduit means from said first burner to said bin, and heat conduit means from said second burner to said bin.

7. The machine of claim 6 including a blower for supplying air to said first burner and said frame including a hollow air-tight member, and conduits between said blower and said hollow member and between said hollow member and said second burner.

8. The machine of claim 1 in which said selective means comprises a first door in said pug mill in the path of said first burner and means to move said door so as to open said pug mill to said path and to block the space between said pug mill and said jacket.

9. The machine of claim 8 including a second door in said jacket and a third door in said pug mill, and means to open said third door and to move said second door so as to form a chute from said pug mill through said jacket.

10. The machine of claim 9 including an elongated handle fixed to said third door and extending through said jacket, an elongated handle fixed to said second door, and interengaging lugs on said handles so arranged that when both doors are closed said third door may not be opened until said second door has first been moved to chute forming position.

11. In a road patching machine comprising a frame mounted on wheels and having a hitch, a bitumen tank, an aggregate bin, a pug mill, burner means for said pug mill, a jacket around said pug mill, and means for directing heat from said burner means to said jacket and to said pug mill, said jacket communicating with said tank and said bin so as to provide a flow passage for the heat from said jacket to said tank and bin.

12. The machine of claim 11 including additional burner means adjacent said tank, a housing, and baffles in said housing defining a serpentine path for the passage of heat discharged into said housing by said additional burner means, said housing communicating with said jacket.

13. The machine of claim 12 including a metering pump for the bitumen in said tank, said pump being located in a heated housing, and said pump housing communicating with said housing for the additional burner means.

14. The machine of claim 11 in which said pug mill includes a pair of shafts, a motor, and transmission means from said engine to said shafts arranged to rotate said shafts in the same direction.

15. The machine of claim 14 in which said transmission means comprises a pair of sprockets joined together and freely rotatable on one of said shafts, a third sprocket fixed to the other of said shafts, a chain drive from said engine to said pair of sprockets, a chain drive from said pair of sprockets to said third sprocket, a fourth sprocket fixed to said other shaft, a fifth sprocket fixed to said one shaft, and a chain drive from said fourth sprocket to said fifth sprocket.

16. The machine of claim 11 including a first discharge gate in said pug mill, a second discharge gate in said jacket, and means to prevent movement of said first gate to discharge position prior to movement of said second gate to discharge position.

17. In a portable road patching machine, a frame, a pug mill mounted on said frame, a burner, a jacket about said pug mill, and means selective to direct the heat and flame from said burner into said pug mill or into said jacket.

18. The machine of claim 17 including a discharge gate in said pug mill and a discharge chute in said jacket, said chute being movable from a jacket-closed position to a jacket-open position, and means connecting said chute and said gate so that said gate can be opened only when said chute is in its jacket-open position.

19. The machine of claim 17 including a bitumen tank and an aggregate bin on said frame, a second burner, means to direct heat and flame from said second burner into contact with said tank, and heat conduit means leading from said jacket and said second burner to said bin, said jacket including a baffle to deflect heat from said first mentioned burner about the outside of said pug mill.

20. The machine of claim 3 including a corrugated bottom for said tank.

21. The machine of claim 6 in which the heat conduit means from said first burner to said bin also extends into heat transfer contact with said tank.

References Cited in the file of this patent

UNITED STATES PATENTS

| | | |
|---|---|---|
| 1,314,797 | Gow | Sept. 2, 1919 |

FOREIGN PATENTS

| | | |
|---|---|---|
| 553,405 | Germany | June 25, 1932 |
| 582,932 | Germany | Aug. 25, 1933 |